United States Patent
Twerdahl et al.

(10) Patent No.: US 7,372,450 B2
(45) Date of Patent: May 13, 2008

(54) ANALOG INPUT MAPPING FOR HAND-HELD COMPUTING DEVICES

(75) Inventors: Timothy D. Twerdahl, Mountain View, CA (US); Robert F. Ebert, Mountain View, CA (US)

(73) Assignee: Inventec Appliances Corporation, Taipei (TW)

( * ) Notice: Subject to any disclaimer, the term of this patent is extended or adjusted under 35 U.S.C. 154(b) by 711 days.

(21) Appl. No.: 10/840,153

(22) Filed: May 5, 2004

(65) Prior Publication Data

US 2005/0248526 A1    Nov. 10, 2005

(51) Int. Cl.
*G09G 5/00* (2006.01)
(52) U.S. Cl. ........... 345/156; 345/160; 345/161; 345/163; 345/168
(58) Field of Classification Search ........ 345/156, 345/160, 161, 163, 168
See application file for complete search history.

(56) References Cited

U.S. PATENT DOCUMENTS

| | | | |
|---|---|---|---|
| 5,708,562 A | 1/1998 | Agata et al. | |
| 5,877,748 A | 3/1999 | Redlich | |
| 5,894,301 A | 4/1999 | Seffernick | |
| 6,433,777 B1 | 8/2002 | Sawyer | |
| 6,462,942 B1 | 10/2002 | McClendon et al. | |
| 6,464,585 B1 | 10/2002 | Miyamoto et al. | |
| 6,563,487 B2 | 5/2003 | Martin et al. | |
| 6,580,418 B1 | 6/2003 | Grome et al. | |
| 6,724,369 B2 | 4/2004 | Slotta | |
| 6,751,312 B1 | 6/2004 | Kudoh | |
| 6,806,865 B2 | 10/2004 | Oueslati et al. | |
| 6,972,682 B2 * | 12/2005 | Lareau et al. ............ | 340/568.1 |
| 2002/0093328 A1 | 7/2002 | Maatta et al. | |
| 2003/0227745 A1* | 12/2003 | Khoo ......................... | 361/686 |
| 2004/0252109 A1 | 12/2004 | Trent et al. | |
| 2005/0097570 A1* | 5/2005 | Bomers ..................... | 719/318 |

OTHER PUBLICATIONS

U.S. Appl. No. 10/840,070, Roy J. Riccomini, System and Method for Generating an Analog Signal in a Hand-Held Computing Device, filed May 5, 2004.
U.S. Appl. No. 10/839,925, Roy J. Riccomini, System and Method for Controlling Polling of a Signal in a Hand-Held Computing Device, filed May 5, 2004.

* cited by examiner

*Primary Examiner*—Richard Hjerpe
*Assistant Examiner*—Leonid Shapiro
(74) *Attorney, Agent, or Firm*—Carr & Ferrell LLP

(57) ABSTRACT

A first hand-held computing device includes an analog input device and a processor. The analog input device generates analog input. The processor receives the analog input and converts the analog input to coordinates. The processor then maps the coordinates to a button for a second hand-held computing device and generates an event indicating a state of the button for the second hand-held computing device.

20 Claims, 5 Drawing Sheets

| Radius | Angular Units in Degrees | Button |
|---|---|---|
| >80% | 60 to 300 | Hard 2 |
| >80% | 30 to 150 | Page Up |
| >80% | 120 to 240 | Hard 1 |
| >80% | 210 to 330 | Page Down |

FIG. 4 ated to U.S. Provisional Application titled "System and Method For Generating an Analog Signal in a Hand-Held Computing Device," filed May 5, 2004, which is hereby incorporated by reference.

ANALOG INPUT MAPPING FOR HAND-HELD COMPUTING DEVICES

CROSS-REFERENCE TO RELATED APPLICATIONS

This application is related to U.S. Provisional Application titled "System and Method For Generating an Analog Signal in a Hand-Held Computing Device," filed May 5, 2004, which is hereby incorporated by reference.

BACKGROUND

1. Field of the Invention

The present invention relates generally to hand-held computing devices, and more particularly to an analog input mapping for hand-held computing devices.

2. Description of the Prior Art

Hand-held computing devices run various software applications such as address books, browsers, and games. Some examples of these hand-held computing devices are personal digital assistants (PDAs). Most PDAs include buttons that a user can press to input information into or navigate through the software applications. In one example for PALM PDAs from PalmOne Inc. in Milpitas, Calif., the buttons are for a date book, address book, scroll up, scroll down, to-do list, and memo pad. Some mobile phones that run PDA operating systems also include these buttons.

When new hardware functionality is added or developed for a hand-held computing device platform, existing software applications may be incompatible with or do not utilize the new hardware functionality. One problem is that the existing software applications for previous hand-held computing device platforms need to utilize the new hardware functionality in order to provide a large number of software applications for the current hand-held computing device platforms.

Gaming consoles such as the Playstation PS2 by Sony Computer Entertainment America, Inc. include two analog joysticks in their analog controllers. In order to emulate legacy Atari games, software applications for the PS2 convert the analog input from the analog controller to the Atari's d-pad and button on the joystick. However, these software applications are for gaming consoles and not hand-held computing devices.

What is needed is to utilize new hardware functionality in a current hand-held computing device to emulate a previous hand-held computing device.

SUMMARY OF THE INVENTION

The invention addresses the above problems by converting analog input in a first hand-held computing device. The first hand-held computing device includes an analog input device and a processor. The analog input device generates analog input. The processor receives the analog input and converts the analog input to coordinates. The processor then maps the coordinates to a button for a second hand-held computing device and generates an event indicating a state of the button for the second hand-held computing device.

In some embodiments, the coordinates comprise x, y components. In some embodiments the coordinates are polar. The processor can retrieve a table of coordinates and the button for the second hand-held computing device and map the coordinates to the button based on the table. In some embodiments, the second hand-held computing device comprises a legacy PALM operating system button implementation, a 4-way button implementation, a 5-way button implementation, or an 8-way button implementation.

By mapping the analog input to buttons, software from previous hand-held computing devices can be compatible with current hand-held computing devices. The analog input device can then be used for software applications that use buttons from a previous hand-held computing device.

BRIEF DESCRIPTION OF THE DRAWINGS

FIG. 4 is a table for coordinates and buttons in an exemplary implementation of the invention.

DETAILED DESCRIPTION OF THE INVENTION

The embodiments discussed herein are illustrative of one example of the present invention. As these embodiments of the present invention are described with reference to illustrations, various modifications or adaptations of the methods and/or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

Figure 1:
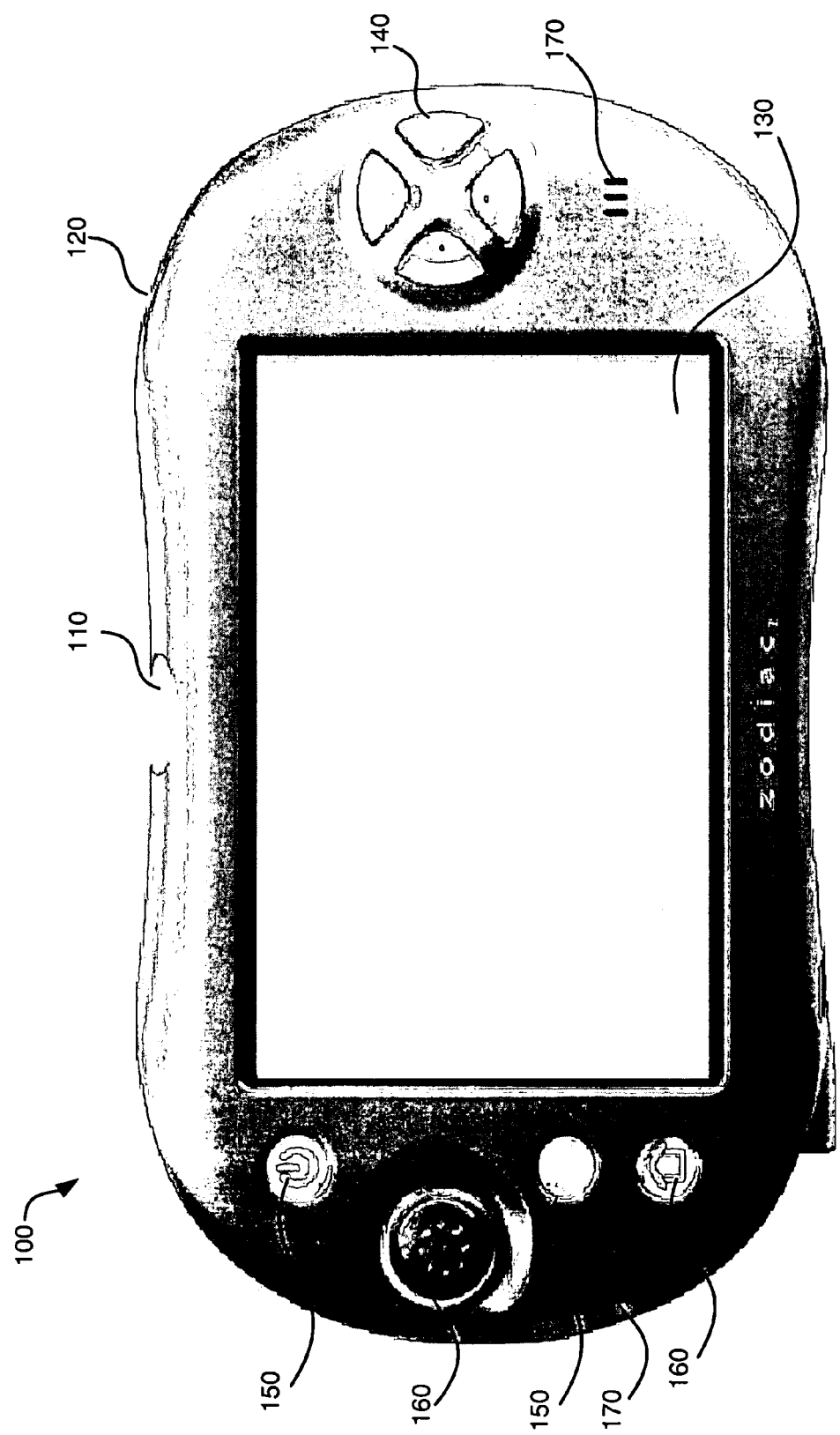
FIG. 1 is a front view illustrating a hand-held computing device in an exemplary implementation of the invention.

FIG. 1 is a front view illustrating a hand-held computing device 100 in an exemplary implementation of the invention. As shown, the hand-held computing device 100 can include, without limitation, a wireless button 110, a housing 120, a display 130, a four-way digital input device 140, one or more digital input devices 150, an analog input device 160, and speakers 170. The housing 120 can be made of any type of suitable material such as plastic, metal, or hard rubber. In the embodiment shown in FIG. 1, the housing 120 is sized such that a user can comfortably hold the hand-held computing device 100 during operation.

The four-way digital input device 140 allows the user to input various types of information into the hand-held computing device 100 by pressing any of four buttons associated with the four-way digital input device 140. In particular, the four-way digital input device 140 is conducive for inputting direction-oriented information into the hand-held computing device 100. The user also can input various types of information into the hand-held computing device 100 by pressing on any one of the digital input devices 150. The buttons on the four-way digital input device 140 may be pressed simultaneously in various combinations such as the "up" and "right" buttons at the same time for an up and right direction.

The analog input device 160 allows the user to input information into the hand-held computing,device 100 simply by exerting force which results in displacement of the analog input device 160 in a specific direction. The analog input device 160 generates analog input that is eventually mapped to buttons in a second hand-held computing device as described in further detail below in FIG. 3. The analog input device 160 is particularly useful when the user is playing a video game on the hand-held computing device 100. For example, the user can input position information in any desired direction using the analog input device 160, thereby allowing the user to direct movement of a character or other graphic object in any direction within the display 130. With the analog input device 160, the user is not limited to only the up, down, left, or right directions. Further, the user can control an amount that the character or other graphic object moves and/or a speed at which that character or other graphic moves within the display 130. For example, in response to the user moving the analog input device 160 slightly from center, a graphic element can move slightly or slowly in that direction, versus a far and rapid movement when the analog input device 160 is moved to a maximum deflection. In addition, the user can change the direction in which the character or other graphic object moves simply by exerting force on a portion of the analog input device 160 in a direction different than the movement of the character or other graphic.

Those skilled in the art will recognize that the analog signal generated by the analog input device 160 can comprise two or more signals, each signal corresponding to displacing the analog input device 160 in a specified direction. For example, as described in further detail herein, the signal generated by the analog input device 160 can comprise x-axis and y-axis signals. Further, the x-axis and y-axis are merely illustrative of a coordinate system, may be redefined without changing the scope of the present invention, and need not be orthogonal. As well, an analog-to-digital converter (not shown) provides digitized input of the analog signal to a processor of the hand-held computing device 100.

The speakers 170 provide audible indicators to users of the hand-held computing device 100. It should be noted that FIG. 1 illustrates an exemplary embodiment of the hand-held computing device 100. Alternative embodiments can comprise more or fewer input devices (e.g., 140, 150, 160), and can arrange the input devices in a different manner on the hand-held computing device 100.

Figure 2:
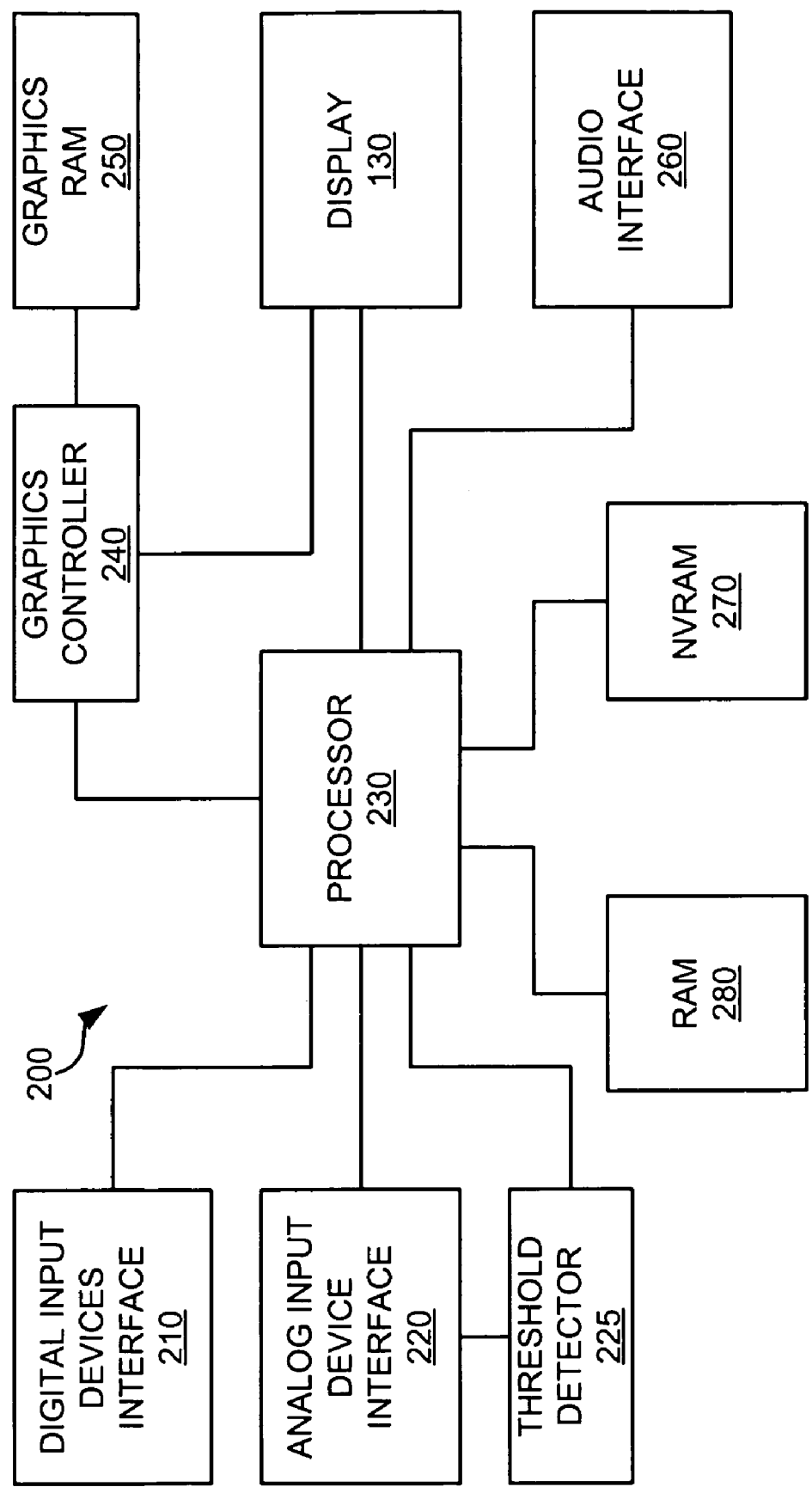
FIG. 2 is a block diagram of a computing system in the hand-held computing device in an exemplary implementation of the invention.

FIG. 2 depicts a block diagram of a computing system 200 of the hand-held computing device 100 (FIG. 1) in an exemplary implementation of the invention. The computing system 200 includes a digital input devices interface 210, an analog input device interface 220, a threshold detector 225, a processor 230, a graphics controller 240, a graphics random access memory (RAM) 250, the display 130 (FIG. 1), an audio interface 260, a non-volatile random access memory (NVRAM) 270, and a RAM 280. Those skilled in the art will recognize this general configuration of the computing system 200 in the hand-held computing device 100, and will understand that the computing system 200 in the hand-held computing device 100 can be configured in many other ways.

The digital input devices interface 210 is configured to receive user input from the four-way digital input device 140 (FIG. 1) and/or digital input devices 150 (FIG. 1) and to transmit that user input in digital form to the processor 230. The analog input device interface 220 is configured to receive analog input from the analog input device 160 (FIG. 1), and to either transmit that analog input in analog form to the threshold detector 225, or digitize that analog input and transmit it in digital form to the processor 230. In exemplary embodiments, the processor 230 is configured to receive and process information from the digital input devices interface 210 and the analog input device interface 220, and to communicate with the analog input device interface 220 and the threshold detector 225.

The processor 230 is configured to execute operating system software and application software. The processor 230 is coupled to and communicates with the digital input devices interface 210, the graphics controller 240, the display 130 (FIG. 1), the audio interface 260, the NVRAM 270, and the RAM 280. The graphics controller 240 communicates with the graphics RAM 250 to generate graphics on the display 130. The processor 230 also communicates with the audio interface 260 to produce various sounds related to the software application(s) running on the processor 230. The RAM 280 and the NVRAM 270 are configured to store data, instructions, and/or software for the processor 230.

Figure 3:
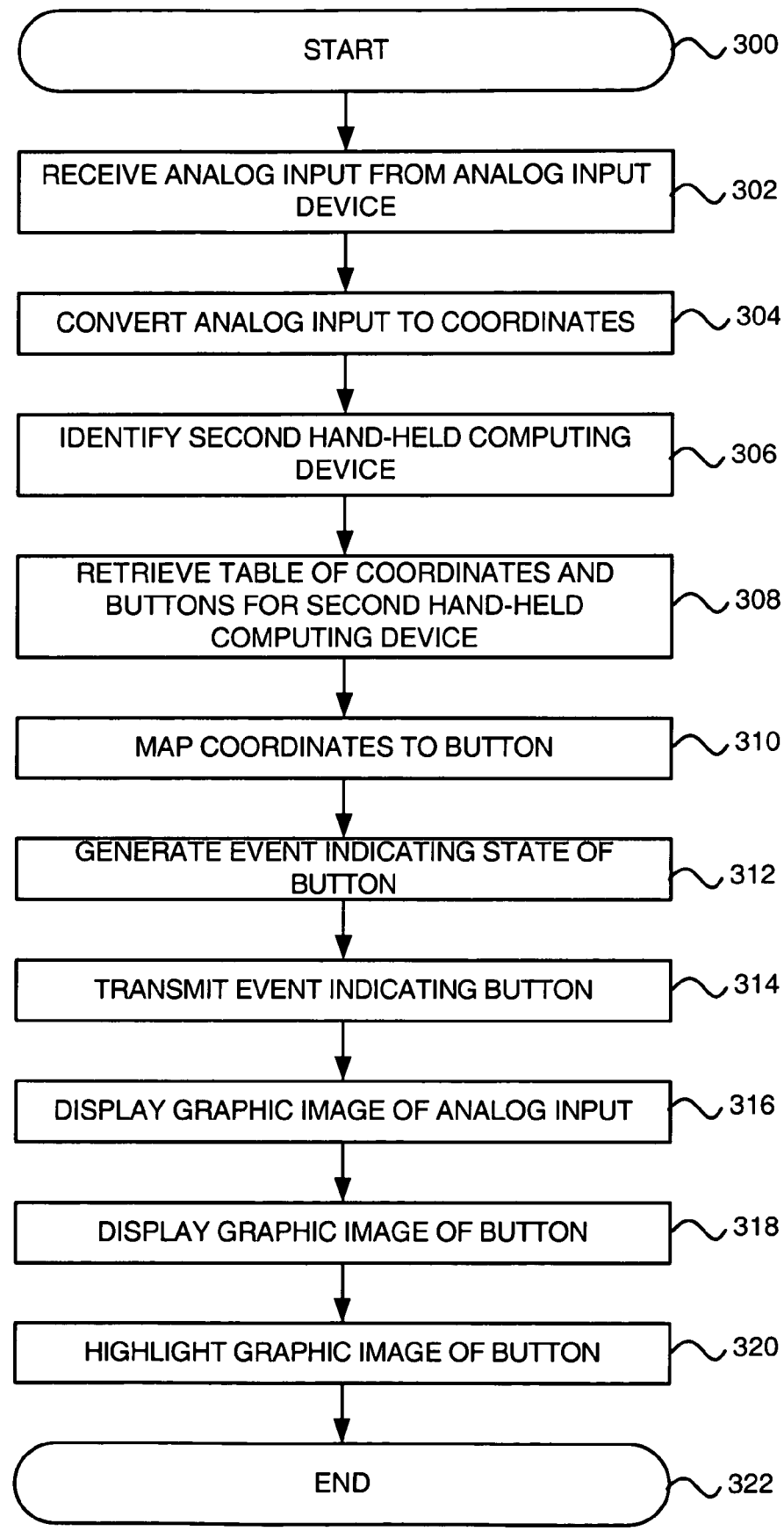
FIG. 3 is a flowchart for converting an analog input in an exemplary implementation of the invention.

FIG. 3 depicts a flowchart for converting an analog input in an exemplary implementation of the invention. In FIG. 3, the analog input from the analog input device 160 (FIG. 1) is mapped to buttons for another hand-held computing device. This mapping allows software from previous hand-held computing devices to be compatible with current hand-held computing devices. In this example, the analog input device 160 can be used for software applications that used buttons from a previous hand-held computing device.

FIG. 3 begins in step 300. In step 302, the analog input device interface 220 (FIG. 2) receives analog input from the analog input device 160 (FIG. 1). In step 304, the analog input device interface 220 converts the analog input into coordinates. In some embodiments, the coordinates comprise x and y components. In other embodiments, the coordinates are polar coordinates for direction and distance such as a radius unit and an angular unit. In some embodiments, the processor 230 (FIG. 2) converts the analog input into coordinates.

In step 306, the processor 230 (FIG. 2) identifies a second hand-held computing device. The second hand-held computing device is identified to determine which device's buttons the analog input should be converted to. In step 308, the processor 230 retrieves a table of coordinates and buttons for the identified second hand-held computing device. One example of coordinates and buttons is described below in FIG. 4. In other embodiments, a data structure, algorithm, equation, formula, or database can be used to convert between coordinates and buttons.

In step 310, the processor 230 (FIG. 2) maps the coordinates to a button on the second hand-held computing device. In step 312, the processor 230 generates an event that indicates a state of the button on the second hand-held computing device. An event is any message, instruction, signal, or parameter that indicates a state of the button on the second hand-held computing device. A state of the button is any status or position the button is in. Some examples of the state of a button is on, off, activate, deactivate, and pressed. In step 314, the processor 230 transmits the event to a software program programmed for the second hand-held computing device. In step 316, the processor 230 displays a graphic image of the analog input on the display 130. In step 318, the processor 230 displays a graphic image of the button on the display 130. In step 320, the processor 230 highlights the graphic image of the button on the display 130. FIG. 3 ends in step 322.

FIG. 4 depicts a table for coordinates and buttons in an exemplary implementation of the invention. In the embodiment in FIG. 4, the coordinates are for polar coordinates that include radii and angular units. The first left column is for a measurement of a radius, which represents the distance from the center position of the analog input device 160. In some embodiments, the radius is a percentage as shown in FIG. 4. In other embodiments, the radius is in units for measurement. The second center column is for angular units in degrees as depicted in FIG. 4. In other embodiments, the angular units are in radians. The third right column is for buttons of a second hand-held computing device. In this embodiment in FIG. 4, the buttons are for a PALM OS personal digital assistant. In one example, the buttons are Hard 2, Page Up, Hard 1, and Page Down.

In a first example using the table in FIG. 4, the coordinates are 85% of the radius and 90 degrees for the angular unit. The button for these coordinates using FIG. 4 is a page up button. In a second example, the coordinates are 100% of the radius and 220 degrees for the angular unit. The buttons for these coordinates using FIG. 4 are both the hard 1 and page down buttons.

Figure 5:
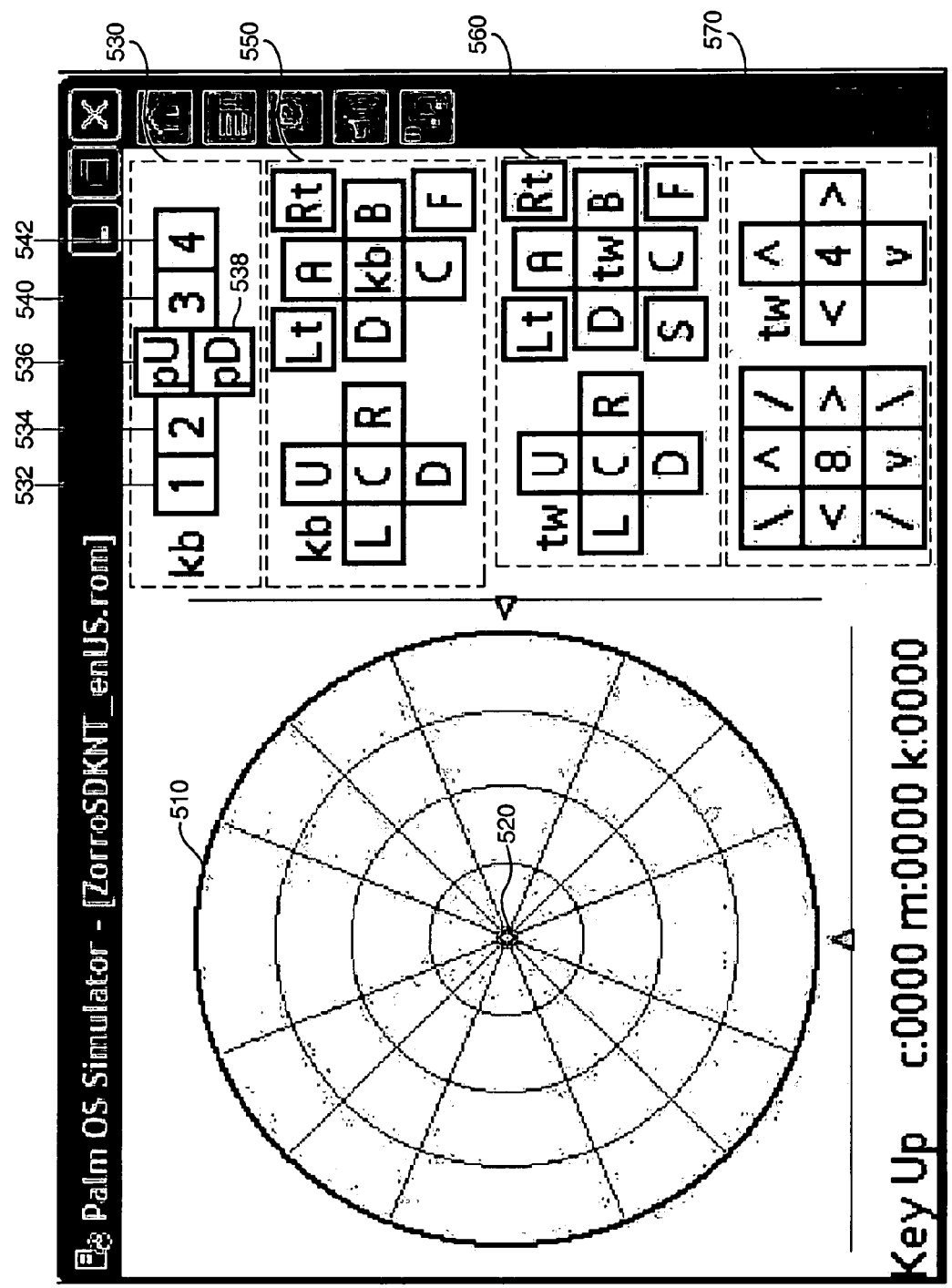
FIG. 5 is a screen shot for displaying graphic images of the analog input and buttons in an exemplary implementation of the invention.

FIG. 5 depicts a screen shot 500 for displaying graphic images of the analog input and buttons in an exemplary implementation of the invention. The processor 230 (FIG. 2) executes a software program to display the screen shot 500 on the display 130 (FIG. 1). The display of the graphic images of the analog input and the buttons serve to illustrate the mapping of the analog input to the buttons in some embodiments. The screen shot 500 includes an analog input graphic image 510, PALM buttons graphic images 530, PALM 5-way buttons graphic images 550, 4-way buttons graphic images 560, and graphic images 570.

The analog input graphic image 510 is a graphic image illustrating the analog input from the analog input device 160 (FIG. 1). The analog input graphic image 510 includes a pointer 520 that tracks the current position of the analog input from the analog input device 160.

The PALM buttons graphic images 530 are for a legacy PALM OS PDA. The PALM buttons graphic images 530 includes graphic images for a hard 1 button 532, a hard 2 button 534, a page up button 536, a page down button 538, a hard 3 button 540, and a hard 4 button 542. In the first example of FIG. 4, where the coordinates for the analog input are 85% of the radius, and 90 degrees for the angular unit, the page up button 536 is highlighted for those coordinates. In the second example of FIG. 4, where the coordinates are 100% of the radius and 220 degrees for the angular unit, the hard 1 button 532 and the page down button 538 are highlighted.

The PALM 5-way buttons graphic images 550 are for a 5-way implementation of buttons for the PALM PDAs. Some examples of the PALM PDA that implemented the 5-way buttons are the Handspring Treo and a 5-way navigation model both from PalmOne. The 4-way buttons graphic images 560 are for a 4-way implementation of buttons with a center select (i.e. the analog input device 160 is pressed in) for a hand-held computing device. The graphic images 570 are for an 8-way implementation and a 4-way implementation of buttons for a hand-held computing device. In the graphic images 570, the center position in the 8-way implementation and the 4-way implementation is not selected when the analog input device 160 is pressed in. Instead, the center position in the 8-way implementation and the 4-way implementation is selected when the analog input device 160 is in the center, rest position. In some embodiments, the graphic images 570 include a center select for the button implementation.

The above-described functions can be comprised of instructions that are stored on storage media. These instructions can be retrieved and executed by a processor 230. Some examples of instructions are software, program code, and firmware. Some examples of storage media are memory devices, tape, disks, integrated circuits, and servers. The instructions are operational when executed by the processor 230 to direct the processor 230 to operate in accord with the invention. Those skilled in the art are familiar with instructions, processor, and storage media.

Those skilled in the art will appreciate variations of the above-described embodiments that fall within the scope of the invention. As a result, the invention is not limited to the specific examples and illustrations discussed above, but only by the following claims and their equivalents.

What is claimed is:

1. A method of converting analog input in a first hand-held computing device, the method comprising:
   receiving the analog input from an analog input device in the first hand-held computing device;
   converting the analog input to polar coordinates;
   mapping the polar coordinates to a button for a second hand-held computing device; and
   generating an event indicating a state of the button for the second hand-held computing device, wherein software executed on the second hand-held computing device may be compatibly executed on the first hand-held computing device.

2. The method of claim 1 wherein the polar coordinates may further be expressed as x, y components.

3. The method of claim 1 further comprising retrieving a table of polar coordinates corresponding to the button for the second hand-held computing device, and wherein mapping the polar coordinates to the button is based on the table.

4. The method of claim 1 wherein the second hand-held computing device comprises a legacy PALM operating system button implementation.

5. The method of claim 1 wherein the second hand-held computing device comprises a 5-way button implementation.

6. The method of claim 1 wherein the second hand-held computing device comprises an 8-way button implementation.

7. The method of claim 1 wherein the second hand-held computing device comprises a 4-way button implementation.

8. A computer-readable storage medium having embodied thereon mapping software program, the mapping software being executable by a processor to perform a method for converting analog input in a first hand-held computing device, the method comprising:
   receiving the analog input from an analog input device in the first hand-held computing device;
   converting the analog input to polar coordinates;
   mapping the polar coordinates to a button for a second hand-held computing device; and
   generating an event indicating a state of the button for the second hand-held computing device, wherein software executed on the second hand-held computing device may be compatibly executed on the first hand-held computing device.

9. The computer-readable storage medium of claim 8, wherein the polar coordinates may further be expressed as x, y components.

10. The computer-readable storage medium of claim 8, the method further comprising retrieving a table of polar coordinates corresponding to the button for the second hand-held computing device, and wherein mapping the polar coordinates to the button is based on the table.

11. The computer-readable storage medium of claim 8, wherein the second hand-held computing device comprises a legacy PALM operating system button implementation.

12. The computer-readable storage medium of claim 8, wherein the second hand-held computing device comprises a 5-way button implementation.

13. The computer-readable storage medium of claim 8, wherein the second hand-held computing device comprises an 8-way button implementation.

14. The computer-readable storage medium of claim 8, wherein the second hand-held computing device comprises a 4-way button implementation.

15. A first hand-held computing device comprising:
- an analog input device configured to generate analog input; and
- a processor configured to receive the analog input from the analog input device, the processor further configured to execute software stored in memory, the software for:
  - converting the analog input to polar coordinates;
  - mapping the polar coordinates to a button for a second hand-held computing device; and
  - generating an event indicating a state of the button for the second hand-held computing device, wherein software executed on the second hand-held computing device may be compatibly executed on the first hand-held computing device.

16. The first hand-held computing device of claim 15 wherein the polar coordinates may further be expressed as x, y components.

17. The first hand-held computing device of claim 15 wherein the processor is further configured to retrieve a table of polar coordinates corresponding to the button for the second hand-held computing device, and wherein mapping the polar coordinates to the button is based on the table.

18. The first hand-held computing device of claim 15 wherein the second hand-held computing device comprises a legacy PALM operating system button implementation.

19. The first hand-held computing device of claim 15 wherein the second hand-held computing device comprises a 5-way button implementation.

20. The first hand-held computing device of claim 15 wherein the second hand-held computing device comprises an 8-way button implementation.

* * * * *